United States Patent
Sreeramoju

(10) Patent No.: US 9,537,797 B2
(45) Date of Patent: Jan. 3, 2017

(54) MTU MANAGEMENT IN A VIRTUALIZED COMPUTER SYSTEM

(71) Applicant: VMware, Inc., Palo Alto, CA (US)

(72) Inventor: Akshay Kumar Sreeramoju, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 51 days.

(21) Appl. No.: 14/304,137

(22) Filed: Jun. 13, 2014

(65) Prior Publication Data

US 2015/0365357 A1    Dec. 17, 2015

(51) Int. Cl.
| | |
|---|---|
| *H04L 12/931* | (2013.01) |
| *H04L 12/703* | (2013.01) |
| *H04L 12/24* | (2006.01) |
| *H04L 12/805* | (2013.01) |
| *H04L 12/721* | (2013.01) |

(52) U.S. Cl.
CPC ........... *H04L 49/70* (2013.01); *H04L 41/0654* (2013.01); *H04L 41/0869* (2013.01); *H04L 45/28* (2013.01); *H04L 45/66* (2013.01); *H04L 47/36* (2013.01)

(58) Field of Classification Search
CPC ...... H04L 49/70; H04L 41/0654; H04L 45/28; H04L 45/66; H04L 47/36
See application file for complete search history.

(56) References Cited

U.S. PATENT DOCUMENTS

| | | | | |
|---|---|---|---|---|
| 9,213,564 | B1* | 12/2015 | Klein | G06F 9/45533 |
| 2008/0184224 | A1* | 7/2008 | Das | G06F 9/5077 718/1 |
| 2009/0307713 | A1* | 12/2009 | Anderson | G06F 11/0712 719/313 |
| 2010/0183009 | A1* | 7/2010 | Baratakke | G06F 9/5077 370/392 |
| 2011/0222557 | A1* | 9/2011 | Starks | H04L 47/365 370/465 |
| 2012/0159481 | A1* | 6/2012 | Anderson | G06F 9/45558 718/1 |
| 2013/0034094 | A1* | 2/2013 | Cardona | H04L 49/70 370/360 |
| 2013/0034109 | A1* | 2/2013 | Cardona | H04L 49/70 370/419 |
| 2014/0241144 | A1* | 8/2014 | Kashyap | H04L 47/365 370/216 |
| 2015/0023146 | A1* | 1/2015 | Suzuki | H04L 12/4633 370/216 |

(Continued)

*Primary Examiner* — Paul H Masur
(74) *Attorney, Agent, or Firm* — Patterson & Sherridan, LLP

(57) ABSTRACT

A management module is implemented in a virtualization software of a virtualized computing device having one or more virtual machines and a virtual switch configured therein. The management module detects a mismatch between a maximum transmission unit (MTU) of the virtual switch and an MTU of a virtual network interface of a virtual machine. An error message may be immediately returned so that the MTU of the virtual network interface may be corrected in response thereto. Otherwise, an error flag indicating the MTU mismatch is set but the connection between the virtual switch and the virtual network interface is allowed to be established. The error flag may be used as a prompt to correct the MTU of the virtual network interface at a later time or to connect the virtual network interface to a different virtual switch.

19 Claims, 4 Drawing Sheets

(56) References Cited

U.S. PATENT DOCUMENTS

2015/0188833 A1* 7/2015 Fusco .................... H04L 47/36
718/1
2015/0200853 A1* 7/2015 Kothari .............. H04L 45/7453
370/392

* cited by examiner

| Device | MTU (A/B) | T0 | T1 | T2 | T3 | T4 | T5 |
|---|---|---|---|---|---|---|---|
| PNIC 170₁ | A or B | →A | A | A | A | A | A |
| vswitch 130₁ | = MTU of PNIC | | A | A | A | A | A |
| VNIC 121₁ | A or B | | | →B | B | →A | A |
| VNIC 121₂ | A or B | | | →A | A | A | A |

Error in VNIC 111₁ MTU setting ↑ (at T3)

corrected input (at T4)

MTU MANAGEMENT IN A VIRTUALIZED COMPUTER SYSTEM

BACKGROUND

A standard or distributed layer-2 virtual switch implemented in a virtualized computing device consists of ports connected to virtual network interfaces (VNICs) of virtual machines (VMs), referred to herein as switchports, and ports connected to physical network interfaces (PNICs), referred to herein as uplinks. In such a virtualized computing device, the VNICs, the virtual switch, and the PNICs have separate MTU (maximum transmission unit) configurations. Typically, the VNIC MTUs are configured to match the virtual network MTU requirements, and the PNIC MTUs are configured to match the physical network MTU requirements. In addition, the virtual switch MTU is configured to match the virtual and physical network MTU requirements. However, because the MTUs of the VNICs and the PNICs are separately configured, it is possible for the virtual switch MTU to become out-of-sync with the virtual or physical network MTU requirements.

Although the out-of-sync condition may lead to network traffic disruptions, it is generally not fatal. Connections between end points would still be allowed despite the MTU mismatches because handshake packets for establishing the connections contain no data and the MTU mismatches would not affect transmission and receipt of frames containing the handshake packets. Disruptions would occur, however, when the size of the frame is greater than the MTU of the receiving end point. When this occurs, the frame will be dropped at the receiving end point and the transmitting end point will repeatedly reduce the frame size and retransmit the frame until it receives acknowledgement of a successful transmission from the receiving end point.

SUMMARY

One or more embodiments provide an MTU management module that detects an MTU mismatch between a virtual switch and a virtual network interface, which may occur when the MTU of a virtual network interface is setup or changed, and notifies the VM administrator of the MTU mismatch. In one embodiment, an error message is immediately returned and displayed to the VM administrator so that the MTU of the virtual network interface may be corrected in response thereto. In another embodiment, an error flag indicating the MTU mismatch is set but the connection between the end points is allowed to be established. The error flag may be used as a prompt for the VM administrator to correct the MTU of the virtual network interface at a later time or to connect the virtual network interface to a different virtual switch.

A method of managing an MTU of a virtual switch, wherein the virtual switch is a component of virtualization software running on a computer system, in communication with a virtual network interface of a virtual machine running on the computer system by way of the virtualization software and a physical network interface, according to an embodiment, includes the steps of determining, by an MTU management component of the virtualization software, an MTU of the virtual network interface of the virtual machine, comparing an MTU of the virtual network interface with the MTU of the virtual switch, determining that the MTU of the virtual network interface does not match the MTU of the virtual switch, and generating an error indication of a mismatch in the MTUs.

Further embodiments include, without limitation, a non-transitory computer-readable storage medium that includes instructions that enable a computer system to implement one or more aspects of the above method as well as a computer system configured to implement one or more aspects of the above method.

DETAILED DESCRIPTION

Figure 1:
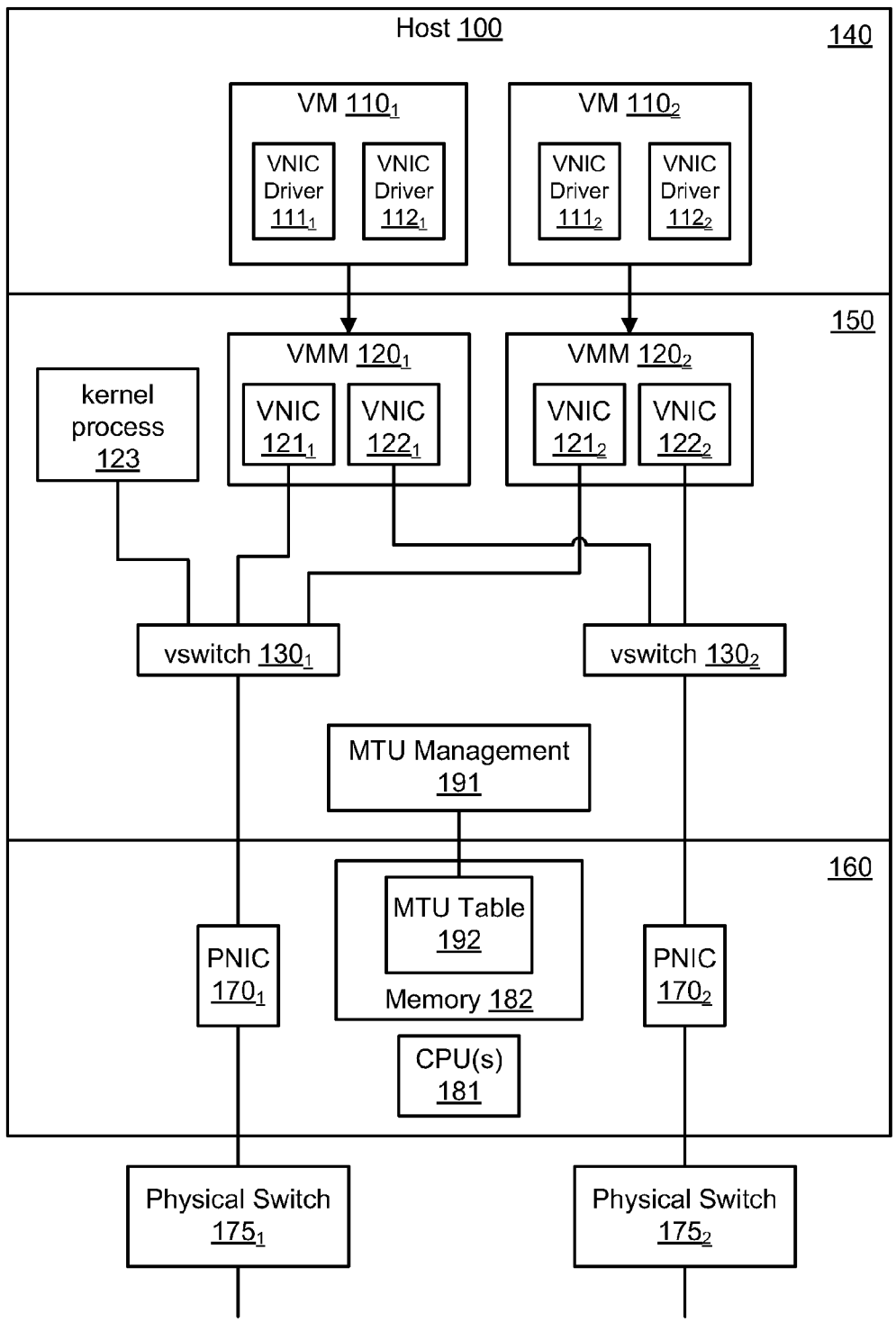
FIG. 1 is a block diagram depicting a host computer system having a virtual switch, in which embodiments may be implemented.

FIG. 1 is a block diagram depicting a host computer system having a virtual switch, in which embodiments may be implemented. Host computer system (host) 100 may be constructed on a desktop, laptop or server grade hardware platform 160, such as an x86 architecture platform. As shown, hardware platform 160 includes one or more central processing units 181, host physical memory 182, and physical network interface controllers (PNICs) 170. Hardware platform 182 also includes other standard hardware components such as one or more host bus adapters (not shown) that connect host 100 to a persistent mass storage device, such as a hard disk drive (HDD), a solid state drive (SSD), a hybrid drive that includes HDD and SSD, or a storage array that is accessed over a storage area network.

In FIG. 1, host 100 supports the execution of one or more virtual machines (VMs) using a virtualization software component, referred to herein as hypervisor 150. As shown in the figure, VM $110_1$ and VM $110_2$ are instantiated and executed in VM execution space 140. Each VM 110 encapsulates an emulated (or "virtualized") physical computing machine platform that is executed under the control of hypervisor 150. An example of hypervisor 150 is the hypervisor included as a component of VMware's vSphere® product, which is commercially available from VMware, Inc. of Palo Alto, Calif. It should be recognized that other hypervisors and virtualized computing platforms having different architectures may be employed in the embodiments, so long as they can support the installation and execution of a guest operating system (OS) which itself is capable of executing guest applications. Examples of a guest OS include any of the well-known commodity operating systems, such as Microsoft Windows®, Linux®, and the like.

In each VM 110, the guest OS controls access to a virtual hardware devices through appropriate drivers installed therein. The virtual hardware platform for each VM 110 includes virtual hardware devices, such as a virtual network interface controllers (or VNICs) 121, 122. VNICs 121, 122 allow the corresponding VM to transmit data and to receive data. The guest OS of each VM 110 controls access to a respective VNIC 121 through a corresponding VNIC driver 111 and to a respective VNIC 122 through a corresponding VNIC driver 112. As shown, the interaction of a VM 110 with hypervisor 150 is facilitated by virtual machine monitors (VMMs) 120. In FIG. 1, each VMM $120_1$, $120_2$ is assigned to and monitors a corresponding VM $110_1$, $110_2$. Further, each VMM 120 includes a corresponding pair of VNICs 121, 122. Although each VM illustrated in FIG. 1 includes two VNICs, it should be recognized that a single VM may have one VNIC or more than two VNICs.

Each VNIC 121 is communicatively coupled to a switchport of a virtual switch (vswitch) $130_1$ and each VNIC 122 is communicatively coupled to a switchport of a virtual switch (vswitch) $130_2$. In addition, PNIC $170_1$ is communicatively coupled to an uplink of virtual switch $130_1$ and PNIC $170_2$ is communicatively coupled to an uplink of virtual switch $130_2$. The switchports and the uplinks for a virtual switch (e.g., virtual switch $130_1$) are illustrated in greater detail in FIG. 2 (e.g., as switchports $211_1$, $211_2$ and uplink $221_1$). Each virtual switch may be implemented as a layer-2 (one layer above the physical layer) switch in software and functions as a bridge that allows multiple VMs to share one of PNICs 170 for communication with other hosts through physical switches 175 and to communicate with each other and with any process running in hypervisor 150 (represented as kernel process 123). In general, the virtual switch is capable of determining whether data received through one of its switchports and uplinks is destined for a VM (i.e., a VM executing on the host) or to an outside network.

In FIG. 1, VNIC $121_1$ is shown connected to a switchport configured in virtual switch $130_1$ and VNIC $122_1$ is shown connected to a switchport configured in virtual switch $130_2$. In addition, VNIC $121_2$ and kernel process 123 are shown each connected to a switchport configured in virtual switch $130_1$ and VNIC $122_2$ is shown connected to a switchport configured in virtual switch $130_2$. PNIC $170_1$ is shown connected to an uplink configured in virtual switch $130_1$ and PNIC $170_2$ is shown connected to an uplink configured in virtual switch $130_2$. As previously mentioned, additional VNICs, virtual switches, and PNICs may be provided, and additional kernel processes may be connected to the virtual switches. However, for simplicity in describing the features of the embodiments, only four VNICs, two virtual switches, two PNICs, and one kernel process are illustrated in FIG. 1 and described herein. Moreover, MTU management techniques according to embodiments will be described in conjunction with virtual switch $130_1$ and it should be recognized that these techniques are applicable to virtual switch $130_2$ also.

Figures 2, 3:
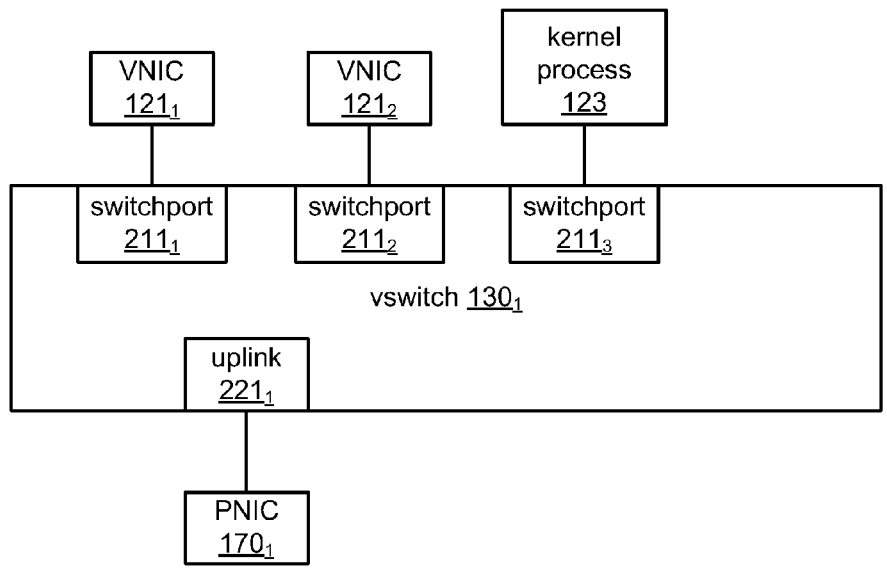
FIG. 2 is a block diagram depicting the virtual switch of FIG. 1 in greater detail.
FIG. 3 is a table that illustrates the propagation of changes in MTUs of different components of the host computer system.

Each virtual switch 130 is a logical collection of "virtual" ports and is configured with an MTU. The virtual ports of virtual switch $130_1$ are shown in FIG. 2 as including switchports $211_1$, $211_2$ that connect to VNICs $121_1$, $121_2$, respectively, switchport $211_3$ that connect to kernel process 123, and uplink $221_1$ that connects to PNIC $170_1$. The MTUs of different virtual switches 130 are managed by an MTU management module 191 and stored in memory 182 in an MTU table 192. A frame received at a virtual port of the virtual switch that has a size that exceeds the MTU of the virtual switch is dropped. As a result, mismatches in MTUs between a VNIC and the virtual switch may result in some of the frames (e.g., frames that have a size larger than the receiving end point's MTU) being dropped.

For example, if VM $110_1$ transmits a frame having a size of 9000 bytes, when the MTU of virtual switch $130_1$ is configured to be 1500 bytes, virtual switch $130_1$ will be unable to receive the frame, i.e., the frame is dropped. In addition, virtual switch 130 may be unable to perform any fragmentation of the large frames that are dropped because virtual switch 130 may be implemented as a layer-2 switch that does not have the requisite functionality for fragmentation. On the other hand, if the frame size is 1500 bytes or lower, the frame would be successfully received by virtual switch $130_1$ and an appropriate acknowledgement of successful frame transmission will be sent back to VM $110_1$.

FIG. 3 is a table that illustrates the propagation of changes in MTUs of different components of the host computer system. The MTUs depicted in FIG. 3 includes MTUs of PNIC $170_1$, virtual switch $130_1$, and VNICs $121_1$,$121_2$. In FIG. 3, the MTU is represented as A or B. A and B are any two different numbers, and may correspond to 9000 bytes and 1500 bytes, respectively.

At T0, a network connection module (not shown) running in host 100 configures the MTU of PNIC $170_1$ based on the physical network MTU requirements. For example, if physical switch $175_1$ is configured to have an MTU of A, the network connection module configures PNIC $170_1$ to have an MTU of A. At T1, MTU management module 191 configures the MTU of virtual switch $130_1$ to be equal to A, the MTU of PNIC $170_1$, so as to match the physical network MTU requirements.

At T2, the administrator of VM $110_1$ configures the MTUs of VNIC $121_1$ and VNIC $121_2$. It should be recognized that the VM administrator is setting the MTU of the virtual network interfaces as if they were physical 1 network interfaces and setting the MTU to any value that is permitted for the physical 1 network interfaces. In this example, the virtual NICs are emulating the physical 1 network interfaces that can be set to have an MTU of either A or B, and so the VM administrator may select between MTU of A and MTU of B. For VNIC $121_1$, it is assumed that the VM administrator has chosen an MTU of B and, for VNIC $121_2$, it is assumed that the VM administrator has chosen an MTU of A.

In a first embodiment, when the MTU for any VNIC is set, the corresponding VMM is programmed to generate an event. In addition, MTU management module 192 registers a function call-back when the event is generated. Through the function call-back, MTU management module 191 identifies the VNIC that has changed its MTU and obtains the value of the changed MTU, and updates the value of the MTU stored for the identified VNIC in MTU table 192. In a second embodiment, the value of the MTU for a VNIC is determined out of context with respect to any MTU changes occurring within the VM. In one such implementation, the value of the MTU for a VNIC is determined as a maximum size of the frames that are transmitted through the VNIC. As the frames are transmitted through the VNIC, when the size of a frame being transmitted exceeds a current maximum size, MTU management module 191 updates the value of the MTU stored for the VNIC in MTU table 192 with the size of the frame being transmitted, i.e., with the new maximum size.

At T3, MTU management module 192 compares the MTUs of the VNIC and the virtual switch. In the first embodiment, this comparison step is performed synchronously after the MTU for the VNIC has been updated in MTU table 192. In the second embodiment, this comparison step is performed periodically or each time the MTU for the VNIC is updated as a result of a new maximum size being established. If, as a result of the comparison, MTU management module 192 detects a mismatch (as between vswitch $130_1$ and VNIC $111_1$ in FIG. 3), MTU management module 192 sets an MTU mismatch error flag. In addition, in the first embodiment, an error message is returned in the same context as the steps carried out by MTU management module 192 in response to the setting of the VNIC's MTU. In some embodiments, the value of the MTU of the virtual switch is returned with the error message to inform the VM administrator what the MTU of the VNIC should be. In other embodiments, the VM may be configured to cause the MTU of the VNIC to be changed programmatically to the same MTU as that of the virtual switch.

At T4, it is assumed that the VM administrator has entered the matching MTU for VNIC $121_1$ and thereafter at T5, frames are exchanged between VNICs $121_1$ and $121_2$ and virtual switch $130_1$ with no frame drops occurring due to MTU mismatches.

Figure 4:
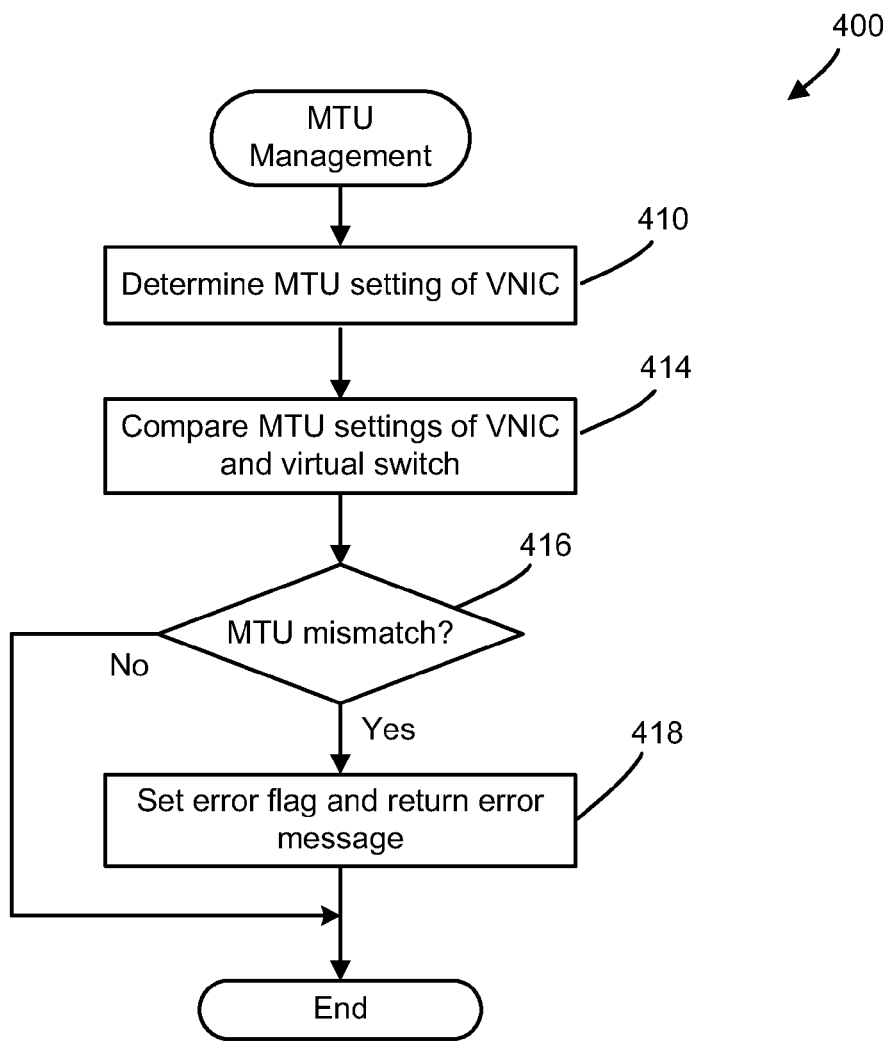
FIG. 4 is a flow diagram depicting a method of managing MTUs of different components of the host computer system, according to an embodiment.

FIG. 4 is a flow diagram depicting a method 400 of managing MTUs of different components of the host computer, according to an embodiment. In the first embodiment, method 400 begins in response to an event generated when the MTU for any VNIC is set. In other embodiments, method 400 begins periodically in accordance with a predefined schedule, or each time a frame having a new maximum size is transmitted through a VNIC.

At step 410, MTU management module 191 determines the updated MTU of the VNIC whose MTU has changed. As discussed previously, MTU management module 192 may determine the MTU of the VNIC through a function callback (in the first embodiment) or by retrieving value of the updated MTU from MTU table 192. Then, at step 414, MTU management module 191 compares the MTU of the virtual switch with the MTU of the VNIC determined at step 410. If MTU management module 191 determines at step 416 that there is an MTU mismatch, MTU management module 191 at step 418 sets an error flag, e.g., in MTU table 192, and returns an error message. In some implementations, the value of the MTU of the virtual switch is returned with the error message to inform the VM administrator what the MTU of the VNIC should be. In other embodiments, the VM may be configured to cause the MTU of the VNIC to be changed programmatically to the same MTU value as that of the virtual switch. If MTU management module 191 determines at step 416 that there is no MTU mismatch, the process ends normally without any error flag being set and without any error message being returned.

Figure 5:
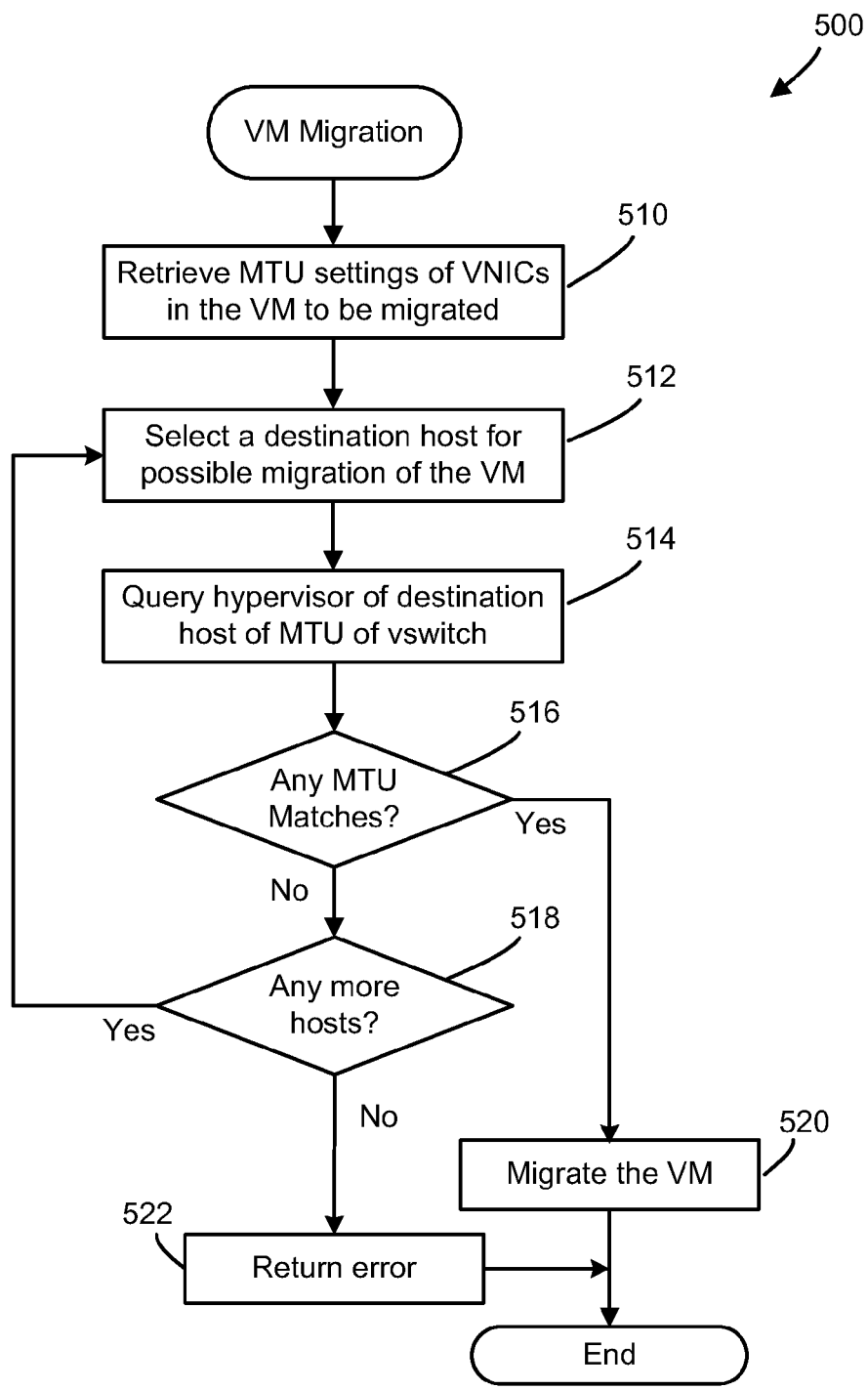
FIG. 5 is a flow diagram depicting a method of selecting a destination host for VM migration, according to an embodiment.

FIG. 5 is a flow diagram depicting a method 500 of selecting a destination host for VM migration, according to an embodiment. Method 500 is executed within a VM migration module executed in a VM management server (not shown).

Method 500 begins at step 510 where the VM migration module retrieves the MTUs of VNICs in the VM to be migrated, e.g., by reading the corresponding entries stored in MTU table 192. Then, at step 512, the VM migration module selects a destination host for possible migration of the VM. The selection of the destination host may be made, for example, according to recommendations made by a distributed resource scheduler (DRS) module running in the VM management server. At step 514, the VM migration module queries the destination host regarding the MTU of virtual switches configured therein. If the VM migration module determines at step 516 that there is a virtual switch with matching MTU, the VM is migrated at step 520 and the process ends.

On the other hand, if the VM migration module determines at step 516 that there are no virtual switches with a matching MTU, steps 512, 514, and 516 are repeated with a new destination host, as recommended by the DRS module. When the VM migration module determines at step 518 that there are no more destination hosts for possible migration of the VM, the VM migration module returns an error at step 522 and the process ends.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of managing a maximum transmission unit (MTU) setting of a virtual switch, the virtual switch being a component of virtualization software running on a computer system, the virtual switch being in communication with a virtual network interface of a virtual machine running on the computer system by way of the virtualization software, the virtual switch also being in communication with a physical network interface, the method comprising:
   determining, by an MTU management component of the virtualization software, an MTU setting of the virtual network interface of the virtual machine;
   comparing the MTU setting of the virtual network interface with the MTU setting of the virtual switch;
   determining that the MTU setting of the virtual network interface does not match the MTU setting of the virtual switch; and
   generating an error indication of a mismatch in the MTU settings.

2. The method of claim 1, further comprising:
   before said comparing, determining the MTU setting of the virtual network interface.

3. The method of claim 2, wherein the MTU setting of the virtual network interface is determined by:
   detecting a predetermined event generated by the virtual machine; and
   calling a function that retrieves the MTU setting of the virtual network interface.

4. The method of claim 2, wherein the MTU setting of the virtual network interface is determined by:
   keeping track of a maximum frame size received from the virtual network interface.

5. The method of claim 1, wherein the error indication is returned to the virtual machine and, in response to the error indication, the virtual machine programmatically changes the MTU setting of the virtual network interface to be same as the MTU setting of the virtual switch.

6. The method of claim 5, wherein the error message indicates the MTU setting of the virtual switch.

7. The method of claim 1, wherein the error indication is an error flag that is associated with the virtual network interface.

8. The method of claim 1, wherein the MTU setting of the virtual switch is equal to an MTU setting of the physical network interface.

9. The method of claim 1, wherein the virtual switch is a layer-2 switch.

10. A non-transitory computer-readable medium comprising instructions executable by a virtualization software of a host in a virtualized computing environment, the host having one or more virtual machines executing therein, a virtual switch configured to transmit data to and from the virtual machines, and a physical network interface, wherein the instructions, when executed, cause the host to perform a method of managing a maximum transmission unit (MTU) setting of the virtual switch that is connected to a virtual network interface of the virtual machines and the physical network interface of the host, the method comprising:
   comparing an MTU setting of the virtual network interface with the MTU setting of the virtual switch;
   determining that the MTU setting of the virtual network interface does not match the MTU setting of the virtual switch; and
   generating an error indication of a mismatch in the MTU settings.

11. The non-transitory computer-readable medium of claim 10, wherein the method further comprises:
   before said comparing, determining the MTU setting of the virtual network interface.

12. The non-transitory computer-readable medium of claim 11, wherein the MTU setting of the virtual network interface is determined by:
   detecting a predetermined event generated by the virtual machine; and
   calling a function that retrieves the MTU setting of the virtual network interface.

13. The non-transitory computer-readable medium of claim 11, wherein the MTU setting of the virtual network interface is determined by:
   keeping track of a maximum frame size received from the virtual network interface.

14. The non-transitory computer-readable medium of claim 10, wherein the error indication is returned to the virtual machine and, in response to the error indication, the virtual machine programmatically changes the MTU setting of the virtual network interface to be same as the MTU setting of the virtual switch.

15. The non-transitory computer-readable medium of claim 14, wherein the error message indicates the MTU setting of the virtual switch.

16. The non-transitory computer-readable medium of claim 10, wherein the error indication is an error flag that is associated with the virtual network interface.

17. A virtualized computing device configured with one or more processors and memory that support execution of one or more virtual machines and a virtual switch that exchanges frames with virtual network interfaces of the virtual machines, the processors being programmed with instructions in said memory to execute a method for managing a maximum transmission unit (MTU) setting of the virtual switch by performing the steps of:
   comparing an MTU setting of a virtual network interface of a virtual machine with an MTU setting of the virtual switch;
   determining that the MTU setting of the virtual network interface does not match the MTU setting of the virtual switch; and
   generating an error indication of a mismatch in the MTU settings.

18. The device of claim 17, wherein the virtual switch is a layer-2 switch.

19. The device of claim 17, wherein the error indication is returned to the virtual machine and, in response to the error indication, the virtual machine programmatically changes the MTU setting of the virtual network interface to be same as the MTU setting of the virtual switch.

* * * * *